US010684992B1

(12) United States Patent
Marks et al.

(10) Patent No.: US 10,684,992 B1
(45) Date of Patent: Jun. 16, 2020

(54) CAUSALLY ORDERING DISTRIBUTED FILE SYSTEM EVENTS

(71) Applicant: EMC IP Holding Company, Hopkinton, MA (US)

(72) Inventors: Raeanne Marks, Seattle, WA (US); Jonathan M. Walton, Seattle, WA (US); Ronald Steinke, Tacoma, WA (US); Karthik Palaiappan, Issaquah, WA (US); Tanuj Khurana, Mercer Island, WA (US); Steven Hubbell, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 396 days.

(21) Appl. No.: 15/581,305

(22) Filed: Apr. 28, 2017

(51) Int. Cl.
*G06F 16/00* (2019.01)
*G06F 16/17* (2019.01)
(Continued)

(52) U.S. Cl.
CPC ........ *G06F 16/1734* (2019.01); *G06F 16/182* (2019.01); *G06F 16/1873* (2019.01); *G06F 16/245* (2019.01)

(58) Field of Classification Search
CPC .... G06F 17/277; G06F 17/2775; G06F 19/00; G06F 3/0487; G06F 16/182; G06F 12/0815; G06F 12/0862; G06F 12/0868; G06F 16/172; G06F 2212/284; G06F 9/46; G06F 9/5066; G06F 11/1662; G06F 11/2035; G06F 11/2046; G06F 16/176; G06F 16/1827; G06F 16/24537; G06F 16/24542; G06F 21/6218; G06F 21/6227; G06F 2221/2141; G06F 3/0604; G06F 3/061; G06F 3/0629; G06F 3/064; G06F 3/0643; G06F 3/067; G06F 3/0689;
(Continued)

(56) References Cited

U.S. PATENT DOCUMENTS 9,367,579 B1 * 6/2016 Kumar ................ G06F 16/1734
2013/0132967 A1 * 5/2013 Soundararajan ...... G06F 9/5066
718/104

(Continued)

*Primary Examiner* — Yicun Wu
(74) *Attorney, Agent, or Firm* — Krishnendu Gupta; Nikhil Patel

(57) ABSTRACT

Implementations are provided herein for using inode revision numbers associated with a modified LIN and a set of Parent LINs to causally order transactions within a distributed file system. Any time an inode is changed, its inode revision number can be incremented by 1. When events within file system are processed causing an inode or a set of inodes to be modified, an event transaction log entry can made. The event transaction log entry can denote a description of the event, a set of modified inode and inode revision number pairs, and a set of parent inode and inode revision number pairs. Entries in the event transaction log can be used to build an inode map for each inode implicated in the event transaction log. The inode map can be used to build a set of direct causal dependencies for each transaction in the event transaction log. The set of direct causal dependencies can be used to generate a causal ordering of the transactions in the event transaction log, that in some implementations, can be made available to external services.

18 Claims, 9 Drawing Sheets

| EVENT TRANSACTION LOG # | PARENT INODE PAIR(S) | MODIFIED INODE PAIR(S) | EVENT |
|---|---|---|---|
| 1 | (1,2) | (3,2) | Change Owner '/b' |
| 2 | (1,2) | (2,2)(3,3) | Rename '/a/c' to '/b/d' |
| 3 | (1,2)(3,3) | (4,4) | Truncate '/b/d' |
| 4 |  | (1,2) | Change Access Permissions '/' |
| 5 | (1,2) | (2,3) | Change Owner '/a' |
| 6 | (1,2)(2,1) | (4,3) | Append '/a/c' |
| 7 | (1,1) | (4,2) | Create '/a/c' |

(51) Int. Cl.
*G06F 16/182* (2019.01)
*G06F 16/245* (2019.01)
*G06F 16/18* (2019.01)

(58) Field of Classification Search
CPC ............... G06F 9/5083; G06F 11/3414; G06F 16/1734; G06F 16/24552; G06F 16/9024; G06F 17/5009; G06F 2009/45579; G06F 2009/45591; G06F 2217/04; G06F 7/08; G06F 9/45558
See application file for complete search history.

(56) References Cited

U.S. PATENT DOCUMENTS

| | | | |
|---|---|---|---|
| 2016/0062694 A1* | 3/2016 | Makkar | G06F 16/176 711/111 |
| 2017/0329648 A1* | 11/2017 | Ren | G06F 9/46 |
| 2018/0024853 A1* | 1/2018 | Warfield | G06F 9/45558 718/1 |

* cited by examiner

| EVENT TRANSACTION LOG # | PARENT INODE PAIR(S) | MODIFIED INODE PAIR(S) | EVENT |
|---|---|---|---|
| 1 | (1,2) | (3,2) | Change Owner '/b' |
| 2 | (1,2) | (2,2)(3,3) | Rename '/a/c' to '/b/d' |
| 3 | (1,2)(3,3) | (4,4) | Truncate '/b/d' |
| 4 |  | (1,2) | Change Access Permissions '/' |
| 5 | (1,2) | (2,3) | Change Owner '/a' |
| 6 | (1,2)(2,1) | (4,3) | Append '/a/c' |
| 7 | (1,1) | (4,2) | Create '/a/c' |

Inode Map

Direct Causal Dependencies

1:   B: (3,2) → (3,1) · None
    A: (3,2) → (3,2) : None
2:   B: (2,2) → (2,1) . 6
    A: (2,2) → (2,2) : None
    B: (3,3) → (3,2) · 1
    A: (3,3) → (3,3) : 3
3:   B: (4,4) → (4,3) . 6
    A: (4,4) → (4,4) : None
4:   B: (1,2) → (1,1) · 7
    A: (1,2) → (1,2) : 1 2 3 4 5 6
5:   B: (2,3) → (2,2) . 2
    A: (2,3) → (2,3) : None
6:   B: (4,3) → (4,2) · 7
    A: (4,3) → (4,3) : None
7:   B: (4,2) → (4,1) . None
    A: (4,2) → (4,2) : None

```
┌─────────────────────────────────────────────────────────────────────┐
│   MAINTAINING AN EVENT TRANSACTION LOG, WHEREIN ENTRIES IN THE EVENT│
│ TRANSACTION LOG ARE ASSOCIATED WITH AN EVENT TRANSACTION LOG NUMBER,│
│   AND WHEREIN ENTRIES IN THE EVENT TRANSACTION LOG CONTAIN AT LEAST │
│ ONE MODIFIED INODE AND INODE REVISION NUMBER PAIR, AND A SET OF     │
│ PARENT INODES AND PARENT INODE REVISION NUMBER PAIRS                │
│                                                                 502 │
└─────────────────────────────────────────────────────────────────────┘
                                  ▼
┌─────────────────────────────────────────────────────────────────────┐
│     GENERATING AN INODE MAP WHEREIN THE INODE MAP MAPS EACH INODE   │
│     REFERENCED IN THE EVENT TRANSACTION LOG TO A SET OF INODE       │
│   REVISION NUMBERS AND A SET OF EVENT TRANSACTION LOG NUMBERS       │
│   BASED ON THE EVENT TRANSACTION LOG                                │
│                                                                 504 │
└─────────────────────────────────────────────────────────────────────┘
                                  ▼
┌─────────────────────────────────────────────────────────────────────┐
│     GENERATING A SET OF DIRECT CAUSAL DEPENDENCIES FOR EACH EVENT   │
│        TRANSACTION LOG NUMBER BASED ON THE GENERATED INODE MAP      │
│                                                                 506 │
└─────────────────────────────────────────────────────────────────────┘
                                  ▼
┌─────────────────────────────────────────────────────────────────────┐
│   CAUSALLY ORDERING THE SET OF EVENTS BASED ON THE SET OF DIRECT    │
│                         CAUSAL DEPENDENCIES                         │
│                                                                 508 │
└─────────────────────────────────────────────────────────────────────┘
```

```
┌─────────────────────────────────────────────────────────────────────────┐
│  MAINTAINING AN EVENT TRANSACTION LOG, WHEREIN ENTRIES IN THE EVENT     │
│  TRANSACTION LOG ARE ASSOCIATED WITH AN EVENT TRANSACTION LOG NUMBER,   │
│  AND WHEREIN ENTRIES IN THE EVENT TRANSACTION LOG CONTAIN AT LEAST ONE  │
│  MODIFIED INODE AND INODE REVISION NUMBER PAIR, AND A SET OF PARENT INODES│
│  AND PARENT INODE REVISION NUMBER PAIRS, WHEREIN MAINTAINING THE EVENT  │
│                      TRANSACTION INCLUDES:                         602  │
│                                                                         │
│   ┌─────────────────────────────────────────────────────────────────┐   │
│   │ IN RESPONSE TO PROCESSING AN EVENT ASSOCIATED WITH AN EVENT INODE,│  │
│   │ WHEREIN THE EVENT INODE IS ASSOCIATED WITH AN EVENT INODE REVISION│  │
│   │                           NUMBER:                                │   │
│   │                                                                  │   │
│   │   ┌──────────────────────────────────────────────────────────┐   │   │
│   │   │    INCREMENTING THE EVENT INODE REVISION NUMBER          │   │   │
│   │   │                                                    610   │   │   │
│   │   └──────────────────────────────────────────────────────────┘   │   │
│   │                              ▼                                   │   │
│   │   ┌──────────────────────────────────────────────────────────┐   │   │
│   │   │  LOGGING THE EVENT INODE AND THE INCREMENTED EVENT INODE │   │   │
│   │   │   REVISION NUMBER INTO AN EVENT TRANSACTION LOG ENTRY    │   │   │
│   │   │                                                    612   │   │   │
│   │   └──────────────────────────────────────────────────────────┘   │   │
│   │                              ▼                                   │   │
│   │   ┌──────────────────────────────────────────────────────────┐   │   │
│   │   │   ADDING A SET OF PARENT INODES AND ASSOCIATED PARENT INODE│  │   │
│   │   │  REVISION NUMBERS TO THE EVENT TRANSACTION LOG ENTRY, WHEREIN│ │   │
│   │   │   THE SET OF PARENT INODES ARE BASED ON THE EVENT INODE  614│   │   │
│   │   └──────────────────────────────────────────────────────────┘   │   │
│   └─────────────────────────────────────────────────────────────────┘   │
└─────────────────────────────────────────────────────────────────────────┘
                                    ▼
┌─────────────────────────────────────────────────────────────────────────┐
│  GENERATING AN INODE MAP WHEREIN THE INODE MAP MAPS EACH INODE          │
│  REFERENCED IN THE EVENT TRANSACTION LOG TO A SET OF INODE REVISION     │
│  NUMBERS AND A SET OF EVENT TRANSACTION LOG NUMBERS BASED ON THE EVENT  │
│                         TRANSACTION LOG                            620  │
└─────────────────────────────────────────────────────────────────────────┘
                                    ▼
┌─────────────────────────────────────────────────────────────────────────┐
│  GENERATING A SET OF DIRECT CAUSAL DEPENDENCIES FOR EACH EVENT          │
│    TRANSACTION LOG NUMBER BASED ON THE GENERATED INODE MAP         630  │
└─────────────────────────────────────────────────────────────────────────┘
                                    ▼
┌─────────────────────────────────────────────────────────────────────────┐
│  CAUSALLY ORDERING THE SET OF EVENTS BASED ON THE SET OF DIRECT CAUSAL  │
│                          DEPENDENCIES                              640  │
└─────────────────────────────────────────────────────────────────────────┘
```

```
┌─────────────────────────────────────────────────────────────────────┐
│  MAINTAINING AN EVENT TRANSACTION LOG, WHEREIN ENTRIES IN THE EVENT │
│  TRANSACTION LOG ARE ASSOCIATED WITH AN EVENT TRANSACTION LOG       │
│  NUMBER, AND WHEREIN ENTRIES IN THE EVENT TRANSACTION LOG CONTAIN   │
│  AT LEAST ONE MODIFIED INODE AND INODE REVISION NUMBER PAIR, AND A  │
│  SET OF PARENT INODES AND PARENT INODE REVISION NUMBER PAIRS        │
│                                                              702    │
└─────────────────────────────────────────────────────────────────────┘
                                 ▼
┌─────────────────────────────────────────────────────────────────────┐
│     GENERATING AN INODE MAP WHEREIN THE INODE MAP MAPS EACH INODE   │
│     REFERENCED IN THE EVENT TRANSACTION LOG TO A SET OF INODE       │
│     REVISION NUMBERS AND A SET OF EVENT TRANSACTION LOG NUMBERS     │
│     BASED ON THE EVENT TRANSACTION LOG                              │
│                                                              704    │
└─────────────────────────────────────────────────────────────────────┘
                                 ▼
┌─────────────────────────────────────────────────────────────────────┐
│   GENERATING A SET OF DIRECT CAUSAL DEPENDENCIES FOR EACH EVENT     │
│   TRANSACTION LOG NUMBER BASED ON THE GENERATED INODE MAP           │
│                                                              706    │
└─────────────────────────────────────────────────────────────────────┘
                                 ▼
┌─────────────────────────────────────────────────────────────────────┐
│   CAUSALLY ORDERING THE SET OF EVENTS BASED ON THE SET OF DIRECT    │
│   CAUSAL DEPENDENCIES                                               │
│                                                              708    │
└─────────────────────────────────────────────────────────────────────┘
                                 ▼
┌─────────────────────────────────────────────────────────────────────┐
│  ASSIGNING SEQUENTIAL TRANSACTION NUMBERS TO THE CAUSALLY ORDERED   │
│  SET OF EVENTS                                                      │
│                                                              710    │
└─────────────────────────────────────────────────────────────────────┘
                                 ▼
┌─────────────────────────────────────────────────────────────────────┐
│    MAKING AVAILABLE THE SEQUENTIAL TRANSACTION NUMBERS TO OTHER     │
│    SERVICES                                                         │
│                                                              712    │
└─────────────────────────────────────────────────────────────────────┘
```

FIG. 7

CAUSALLY ORDERING DISTRIBUTED FILE SYSTEM EVENTS

FIELD OF THE INVENTION

This invention relates generally to processing data, and more particularly to causally ordering distributed file system events using inode revision numbers.

BACKGROUND OF THE INVENTION

Distributed file systems offer many compelling advantages in establishing high performance computing environments. One example is the ability to easily expand, even at large scale. Another example is the ability to store different types of data, accessible by different types of clients, using different protocols. A distributed file system can operate on a cluster of nodes, allowing clients to connect to any node of the cluster to access and/or modify data residing on any node of the cluster.

Events within the file system can create a new file, change permissions on a file, change the metadata of a file, etc. These events can happen in parallel and can be processed on different nodes of the cluster of nodes. The distributed file system may have in place locking mechanisms that prevent access to a file while it is being modified by another user or file system process. However, as events are processed that change the metadata on files, it is desirable to know a causal order of the actions that have been processed, no matter which node is processing the individual events.

One method to order events could be to use timestamps and associate them with each event. For example, you could place a timestamp on the event of creating a file on Node A and place a second timestamp when changing permissions of the same file on Node B. While in this example, you cannot change permissions on a file before it has been created, if the events were processed in a very small time window, clocks that are not perfectly synced between nodes could introduce enough error to produce inconsistent results.

In another example, even if the timestamps of operations was perfectly in sync amongst nodes of the cluster of nodes, the chronological ordering of events may be less important and have less value than a causal order of events. For example, in a distributed file system, some events that are processed in a chronological order may have a different causal order. For example, in a non-native Hadoop Distributed File System ("HDFS") environment, operations can be processed in a chronological ordering which a traditional HDFS environment would not allow, due to how data is organized and processed in each respective environment. Therefore, there exists a need to guarantee a causal order of events in a distributed file system.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, an event transaction log can be maintained, wherein entries in the event transaction log are associated with an event transaction log number, and wherein entries in the event transaction log contain at least one modified inode and inode revision number pair, and a set of parent inodes and parent inode revision number pairs. An inode map can be generated, wherein the inode map maps each inode referenced in the event transaction log to a set of inode revision numbers and a set of event transaction log numbers based on the event transaction log. A set of direct causal dependencies can be generated for each event transaction log number based on the generated inode map. The set of events can be causally ordered based on the set of direct causal dependencies.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

FIG. 2 illustrates an example inode map in accordance with implementations of this disclosure;

FIG. 3 illustrates an example direct causal dependencies mapping in accordance with implementations of this disclosure;

FIG. 5 illustrates an example flow diagram method for causally ordering events within a distributed file system in accordance with implementations of this disclosure;

FIG. 6 illustrates an example flow diagram method for causally ordering events within a distributed file system including logging new events into the event transaction log in accordance with implementations of this disclosure;

FIG. 7 illustrates an example flow diagram method for causally ordering events within a distributed file system and making the sequential ordering available to external services in accordance with implementations of this disclosure;

DETAILED DESCRIPTION

Figure 1:
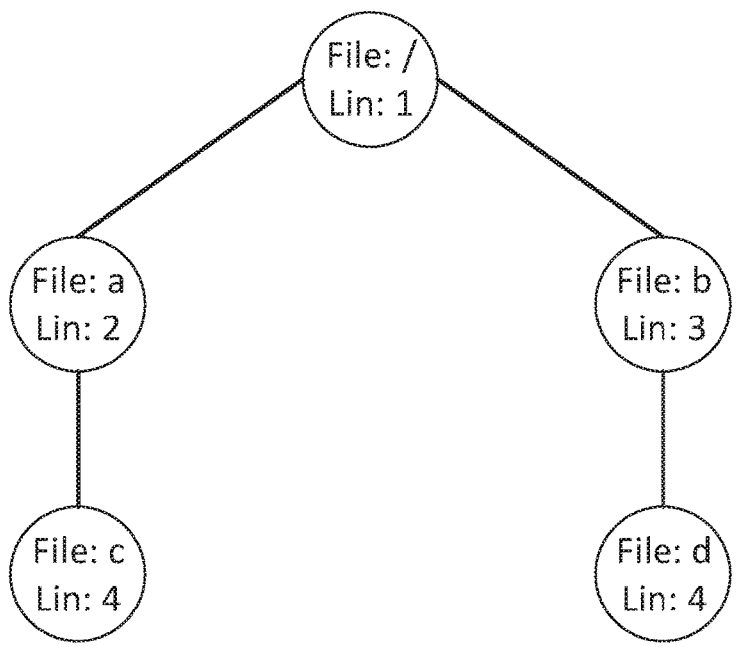
FIG. 1 illustrates an example illustration of a directory and file tree along with an example transaction log in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As used herein, the term "node" refers to a physical computing device, including, but not limited to, network devices, servers, processors, cloud architectures, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode number "LIN" mappings that reference unique inodes that contain the physical location(s) of the data stored within the file system. For example, processes can use unique LIN's to reference the associated inode that can contain a data tree that maps the logical block numbers to the actual physical location(s) of the block file data for a file within the file system. In one implementation, nodes among the cluster of nodes run a common operating system kernel. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

The term "inode" as used herein refers to either an in-memory representation or an on-disk data structure that can store information, or meta-data, about files and directories, such as file size, file ownership, access mode (read, write, execute permissions), time and date of creation and modification, file types, data protection process information such as encryption and/or compression information, snapshot information, hash values associated with location of the file, mappings to cloud data objects, pointers to a cloud metadata objects, etc. In one implementation, inodes may be in a known location in a file system, for example, residing in cache memory for fast and/or efficient access by the file system. In accordance with implementations disclosed herein, inodes can be associated with an inode revision number that is incremented in real time as the inode is modified. As discussed herein, inodes can be referred to by their LIN because the LIN is a unique identifier for that inode. It can be appreciated that the LIN is only one field in an inode.

In some implementations, a data structure explicitly named "inode" and/or LIN's may be absent, but file systems may have data structures that store data similar to inodes and may provide capabilities similar to inodes as described herein. It can be appreciated that the concepts and implementations as provided herein are functional using data structures not termed inodes but that offer the same functionality to the file system.

Implementations are provided herein for using inode revision numbers associated with a modified inode and a set of Parent LINs to causally order transactions within a distributed file system. Any time an inode is changed, its inode revision number can be incremented by 1. When events within file system are processed causing an inode or a set of inodes to be modified, an event transaction log entry can made. The event transaction log entry can denote a description of the event, a set of modified inode and inode revision number pairs (i.e., where pairs are {LIN, inode revision number}), and a set of parent inode and inode revision number pairs. Entries in the event transaction log can be used to build an inode map for each inode implicated in the event transaction log. The inode map can be used to build a set of direct causal dependencies for each transaction in the event transaction log. The set of direct causal dependencies can be used to generate a causal ordering of the transactions in the event transaction log, that in some implementations, can be made available to external services.

In one implementation, in response to processing file system events associated with an inode, an inode revision number of a modified inode can be incremented by 1, and log entries can be created in an event transaction log that contain the LIN of the newly modified inode, its newly modified inode revision number, and a set of parent LINs and parent inode revision numbers.

In one implementation, at least two of the causally ordered events can be processed in parallel on at least two different nodes among the cluster of nodes operating as a distributed file system.

In one implementation, any file system event that makes changes to LIN metadata can be causally ordered. It can be appreciated that those events can include changing permissions, changing ownership, setting times, creating a file/directory, deleting a file/directory, renaming a file/directory, an append, etc.

In one implementation, a causally ordered list of transactions can be assigned sequential transactions numbers and be made available to external services. It can be appreciated that the external services can be iNotify, a component of the Hadoop Distributed File System ("HDFS"). It can further be appreciated that a distributed file system, like Dell EMC OneFS, can emulate an HDFS environment to provide file services to HDFS clients using the HDFS protocol.

Co-pending U.S. patent application Ser. No. 15/197,673 for "LOAD BALANCING HADOOP DISTRIBUTED FILE SYSTEM OPERATIONS IN A NON-NATIVE OPERATING SYSTEM" is incorporated herein by reference for all purposes. It can be appreciated that because a non-native HDFS operating system can have each node operate as both a NameNode and a DataNode, there is not a single NameNode that acts a gateway to the emulated HDFS environment. In a native HDFS environment, when a client makes a NameNode request for an event, the events can be more easily logged in the order they are processed by the single NameNode without requiring steps to causally order events as the single NameNode is solely responsible for processing and ordering HDFS events. In a non-native HDFS operating system, different nodes can process HDFS operations in parallel and ordering those operations in sequence, as can be required by certain aspects of the HDFS protocol and its associated services, is desirable. Implementations are provided herein to sequentially order HDFS transactions in a non-native HDFS environment where operations are processed by multiple nodes in parallel without a single NameNode acting as a gateway.

In one implementation, a causal ordering is generated that may not be the same as a chronological ordering of events in a non-native HDFS environment. For example, a first operation is the changing the permissions on directory C having a path of /a/b/c. A second operation is changing the owner on File E having a path of /a/b/c/d/e. If you open /a/b/c for changing permissions and then open /a/b/c/d/e before changing permissions on /a/b/c/, and perform the change permissions operations on C before File E has been modified, you may have a causal dependency established that is outside of chronological order. Continuing the example, what if the first transaction was changing the permissions on directory C that would prevent the second transaction from having permission to access File E. Thus, chronologically the first operation was processed first; however, we know that causally the first operation must have happened second because the second operation wouldn't have access to File E if ordered differently. It can be appreciated that in a native HDFS environment, this is not a legal operation. By causally ordering events, events can be reported as they should happen in a native HDFS environment even if chronologically they happen in a different order in a non-native HDFS environment.

FIG. 1 illustrates an example illustration of a directory and file tree along with an example transaction log in accordance with implementations of this disclosure. The directory and file tree labels both directories and files as Files, however, it can be appreciated that inodes can be associated with either files or directories and operate in a similar manner. In this example, we have a root of File '/' that has two children in File A and File B. File A has a child marked as File C and File B also has a child marked as File D. Each of the files is also associated with a LIN. File '/' is associated with LIN 1; File A is associated with LIN 2; File B is associated with LIN 3; File C is associated with LIN 4; and File D is associated with LIN 4 as well.

The event transaction log can log the LIN associated with the inodes and associated inode revisions numbers as pairs for both the modified inode and its parents. For example, the first entry in the event transaction log, entry #1, is a change owner event targeted to File B. The modified inode pair for this event is the LIN associated with the inode of File B (i.e., LIN 3) that has an inode revision number of 2. Because File '/' is a parent of File B, the LIN associated with its inode and current inode revision number are also logged as a parent inode pair. In this example, the pair is (1,2) to denote that its parent inode has a LIN of 1 and an inode revision number of 2 at the time the event was processed.

The second entry in the event transaction log is a rename operation whereby File C that was a child to File A is renamed to File D which is a new child to File B. As the file content and metadata remains unchanged in a rename, this operation modifies the parent directories of the file to include the subtraction or addition of File C and File D respectively as children to their parents. Thus, in this example, the modified inode pairs include both the old parent inode having a LIN of 2 and an inode revision number of 2 and the new parent inode having a LIN of 3 with an inode revision number of 3. Because File '/' is a parent of both File A and File B, the LIN associated with its inode and current inode revision number are also logged as a parent inode pair. In this example, the pair is (1,2) to denote that its parent inode has LIN of 1 and an inode revision number of 2 at the time the event was processed.

The third entry in the event transaction log, entry #3, is a truncate operation targeted to File D. The modified inode has LIN of 4 with an inode revision number of 4. The parent inode pairs for File D are File B, that has mode with a LIN of 3 with an mode revision number of 3, and File '/', that has inode with a LIN of 1 with an inode revision number of 2.

The fourth entry is a change in access permissions targeted to File T. The modified inode has a LIN of 1 with an inode revision number of 2. There are no parent inode pairs as File '/' is the root directory in this example.

The fifth entry is a change in ownership to File A. The modified inode has a LIN of 2 with an inode revision number of 3. The parent inode for File '/' has a LIN of 1 with an inode revision number of 2.

The sixth entry is an append to File C. The modified inode has a LIN of 4 with an inode revision number of 3. The parent inode pairs have a LIN of 1 with an inode revision number of 2 and have a LIN of 2 with an inode revision number of 1.

The seventh entry is to create File C. The modified inode has a LIN of 4 with an inode revision number of 2. The parent inode pair has a LIN of 1 with an inode revision number of 1.

In one implementation, in response to logging the target inode for a create, delete, or rename operation, the target inode is assigned an inode revision number of 0. It can be appreciated that by assigning the inode target with an inode revision number of 0, it can take less compute cycles to draw after dependencies, which can lead to better performance in race conditions.

FIG. 2 illustrates an example inode map in accordance with implementations of this disclosure. The example inode map in FIG. 2 maps the transactions as depicted in the transaction log in FIG. 1. Each unique inode LIN referenced in the transaction log in FIG. 1 can be mapped in the inode map. As the transaction log in FIG. 1 referenced 4 unique LINs {1, 2, 3, 4}, those four LINs are used as the basis for the example inode map in FIG. 2.

For LIN 1, the transaction log references two different inode revision numbers {1, 2}. Each unique inode revision number is then associated with the event transaction log entry numbers that reference that inode revision number. For LIN 1, transaction log entry 7 is the sole entry that references an inode revision number of 1. Transaction log entries {1, 2, 3, 4, 5, 6} all reference an inode revision number of 2 for LIN 1 and are mapped accordingly in FIG. 2.

For LIN 2, the transaction log references three different inode revision numbers {1, 2, 3}. Each unique inode revision number is then associated with the event transaction log entry numbers that reference that inode revision number. For LIN 2, transaction log entry 6 is the sole entry that references an inode revision number of 1. Transaction log entry 2 is the sole entry that references an inode revision number of 2. Transaction log entry 5 is the sole entry that references an inode revision number of 3. These references are mapped accordingly in FIG. 2.

For LIN 3, the transaction log references two different inode revision numbers {2, 3}. Each unique inode revision number is then associated with the event transaction log entry numbers that reference that inode revision number. For LIN 3, transaction log entry 1 is the sole entry that references an inode revision number of 2. Transaction log entries {2, 3} both reference an inode revision number of 3. These references are mapped accordingly in FIG. 2.

For LIN 4, the transaction log references three different inode revision numbers {2, 3, 4}. Each unique inode revision number is then associated with the event transaction log entry numbers that reference that inode revision number. For LIN 4, transaction log entry 7 is the sole entry that references an inode revision number of 2. Transaction log entry 6 is the sole entry that references an inode revision number of 3. Transaction log entry 3 is the sole entry that references an inode revision number of 4. These references are mapped accordingly in FIG. 2.

FIG. 3 illustrates an example direct causal dependencies mapping in accordance with implementations of this disclosure.

For every edit shown here, the "before dependencies" and the "after dependencies" are listed, noted as "B" or "A" under each edit number. In the case of the before dependencies, the second tuple contains the same LIN of the same modified inode and one smaller revision number. In the case of the after dependencies, the second tuple contains the same LIN of the same modified inode and the same revision number. These second tuples are looked up in the Inode Map to find edits which contain these LIN, revision combinations for direct causal dependencies. It can be appreciated that transactions do not draw dependency to themselves.

For example, for transaction 1, LIN 3 was modified by the change owner event, and the newly modified inode revision number is 2. Therefore, before transaction 1 was processed, LIN 3 had an inode revision number of 1 and after transaction 1 was processed, LIN 3 had an inode revision number of 2. Thus, any transaction that references LIN 3 having an inode revision number of 1 must have occurred prior to transaction 1, and any transaction that references LIN 3 having an inode revision number of 2 or greater must have occurred after transaction 1. However, the process only look at transactions with the same inode revision number of 2 for direct causal dependencies. In this example, none of these conditions are satisfied by any of the transactions so the result is "None" in both the before and after cases.

Continuing the example for transaction 2, LIN 2 was modified by the rename operation and its new inode revision number as a result of the modification is 2. Therefore, before transaction 2 was processed, LIN 2 had an inode revision number of 1 and after transaction 2 was processed, LIN 2 had an inode revision number of 2. Thus, any transaction that references LIN 2 having an inode revision number of 1 would must have occurred prior to transaction 2, and any transaction that references LIN 2 having an inode revision number of 2 or greater must have occurred after transaction 2. In this example, transaction 6 denotes a parent LIN 2 having an inode revision number of 1 at the time of transaction 6, thus transaction 6 must have occurred before transaction 2. None of the transactions reference LIN 2 with an inode revision number of 2.

Transaction 2 also modified LIN 3 when processing the rename operation, and its new inode revision number as a result of the modification is 3. Therefore, before transaction 2 was processed, LIN 3 had an inode revision number of 2, and after transaction 2 was processed, LIN 3 had an inode revision number of 3. Thus, any transaction that references LIN 3 having an inode revision number of 2 would must have occurred prior to transaction 2, and any transaction that references LIN 3 having an inode revision number of 3 or greater must have occurred after transaction 2. In this example, transaction 1 denotes a modified LIN 3 having an inode revision number of 2 at the end of transaction 1, thus transaction 1 must have occurred before transaction 2. Transaction 3 denotes a parent LIN 3 having an inode revision number of 3, thus transaction 3 must have occurred after transaction 2.

Continuing the example for transaction 3, LIN 4 was modified by the truncate operation and its new inode revision number as a result of the modification is 4. Therefore, before transaction 3 was processed, LIN 4 had an inode revision number of 3 and after transaction 3 was processed, LIN 4 had an inode revision number of 4. Thus, any transaction that references LIN 4 having an inode revision number of 3 or less must have occurred prior to transaction 3, and any transaction that references LIN 4 having an inode revision number of 4 or greater must have occurred after transaction 3. In this example, transaction 6 denotes modifying LIN 4 as a part of the transaction and having an inode revision number of 3 after the modification performed by transaction 6, thus transaction 6 must have occurred before transaction 3. None of the transactions reference LIN 4 with an inode revision number of 4 or greater.

Continuing the example for transaction 4, LIN 1 was modified by the change access permissions operation and its new inode revision number as a result of the modification is 2. Therefore, before transaction 4 was processed, LIN 1 had an inode revision number of 1 and after transaction 4 was processed, LIN 1 had an inode revision number of 2. Thus, any transaction that references LIN 1 having an inode revision number of 1 or less must have occurred prior to transaction 4, and any transaction that references LIN 1 having an inode revision number of 2 or greater must have occurred after transaction 4. In this example, transaction 7 denotes having a parent LIN 1 with an inode revision number 1 at the time transaction 7 was performed, thus transaction 7 must have occurred before transaction 4. Transactions 1, 2, 3, 4, 5, and 6 all denote LIN 1 having an inode revision number of 2 as parent LIN's to their respective transactions, thus, these transaction must have occurred after transaction 4.

Continuing the example for transaction 5, LIN 2 was modified by the change owner operation and its new inode revision number as a result of the modification is 3. Therefore, before transaction 5 was processed, LIN 2 had an inode revision number of 2 and after transaction 5 was processed, LIN 2 had an inode revision number of 3. Thus, any transaction that references LIN 2 having an inode revision number of 2 or less must have occurred prior to transaction 5, and any transaction that references LIN 2 having an inode revision number of 3 or greater must have occurred after transaction 5. In this example, transaction 2 denotes modifying LIN 2 as a part of the transaction and having an inode revision number of 2 after the modification performed by transaction 2, thus transaction 2 must have occurred before transaction 5. None of the transactions reference LIN 2 with an inode revision number of 3 or greater.

Continuing the example for transaction 6, LIN 4 was modified by the change append operation and its new inode revision number as a result of the modification is 3. Therefore, before transaction 6 was processed, LIN 4 had an inode revision number of 2 and after transaction 6 was processed, LIN 4 had an inode revision number of 3. Thus, any transaction that references LIN 4 having an inode revision number of 2 or less must have occurred prior to transaction 6, and any transaction that references LIN 4 having an inode revision number of 3 or greater must have occurred after transaction 6. In this example, transaction 7 denotes modifying LIN 4 as a part of the transaction and having an inode revision number of 2 after the modification performed by transaction 7, thus transaction 7 must have occurred before transaction 6. None of the transactions reference LIN 4 with an inode revision number of 3.

Continuing the example for transaction 7, LIN 4 was modified by the change create event, and the newly modified inode revision number is 2. Therefore, before transaction 7 was processed, LIN 4 could have had an inode revision number of 1 and after transaction 7 was processed, LIN 4 had an inode revision number of 2. Thus, any transaction that references LIN 4 having an inode revision number of 1 must have occurred prior to transaction 7, and any transaction that references LIN 4 having an inode revision number of 2 or greater must have occurred after transaction 7. However, the process only look at transactions with the same inode revision number of 2 for direct causal dependencies.

In this example, none of these conditions are satisfied by any of the transactions so the result is "None" in both the before and after cases.

Figure 4:
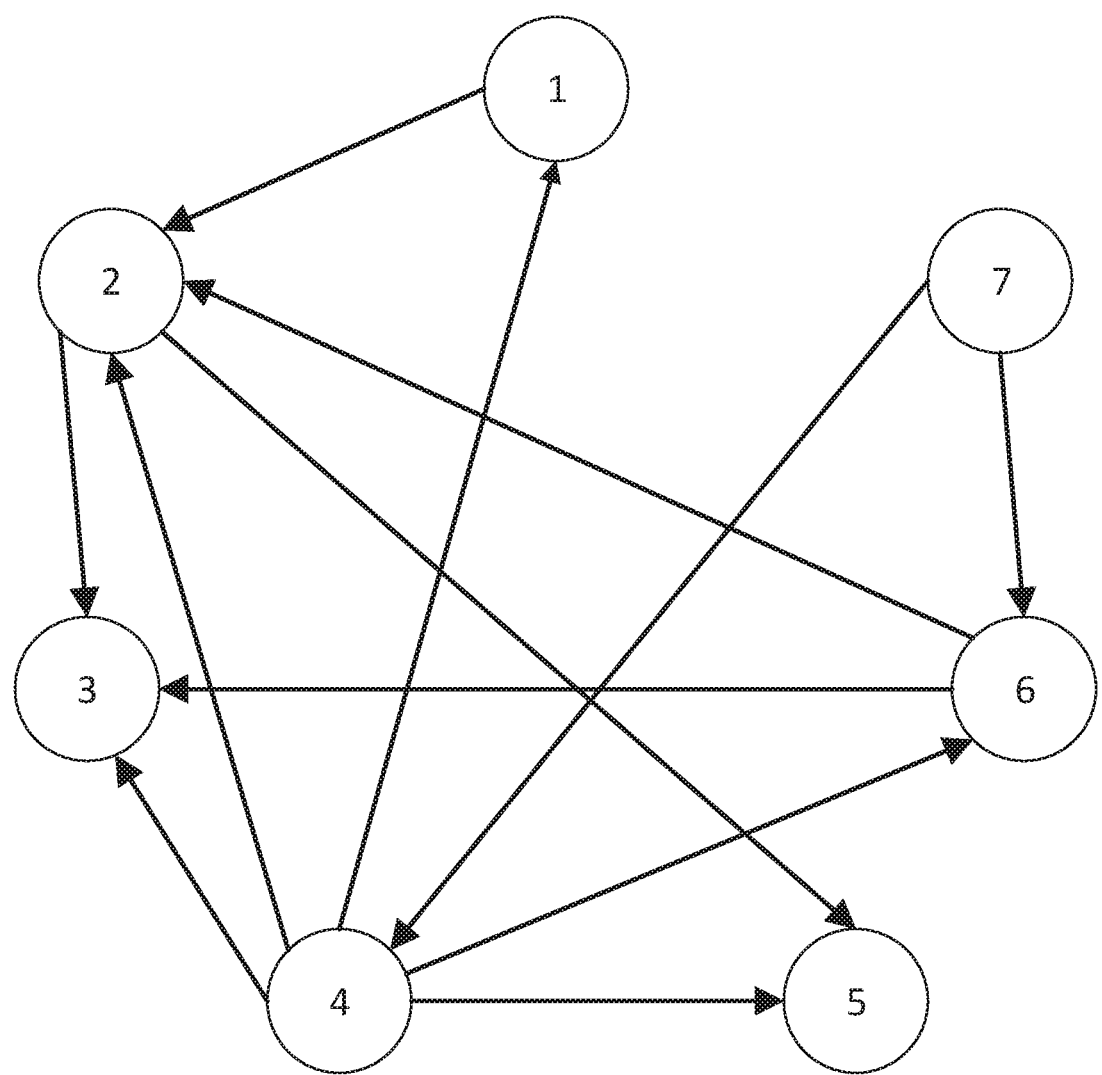
FIG. 4 illustrates an example directed acyclic graph in accordance with implementations of this disclosure.

FIG. 4 illustrates an example directed acyclic graph "DAG" in accordance with implementations of this disclosure. The DAG depicted in FIG. 4 uses the before and after direct causal dependencies as derived and explained in FIG. 3 to populate its graph. The arrows denote the direct dependencies. As discussed above, in regards to transaction 2 in FIG. 3, transaction 6 must have occurred prior to transaction 2, thus an arrow is drawn from transaction 6 to transaction 2 to denote that transaction 2 must have occurred after transaction 6. The remaining direct causal dependencies as described in FIG. 3 are populated similarly. In one implementation, once the DAG is populated with all relevant information, a topological sort operation can be performed on the set of transactions to determine a true causal ordering of transactions. In this example, a topological sort would produce a causal ordering of {7, 4, 6, 1, 2, 3, 5}. It can be appreciated that transactions 3 and 5 are not causally related with each other, and can be considered concurrent.

FIGS. 5-7 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Referring now to FIG. 5, there is illustrated an example flow diagram method for causally ordering events within a distributed file system in accordance with implementations of this disclosure. At 502, an event transaction log can be maintained, wherein entries in the event transaction log are associated with an event transaction log number, and wherein entries in the event transaction log contain at least one modified inode and inode revision number pair, and a set of parent inodes and parent inode revision number pairs. In one implementation, the set of events are processed in parallel on at least two different nodes among a cluster of nodes operated as a distributed file system. In one implementation, the set of events are based on changes to the metadata associated with at least one inode.

At 504, an inode map can be generated, wherein the inode map maps each inode referenced in the event transaction log to a set of inode revision numbers and a set of event transaction log numbers based on the event transaction log.

At 506, a set of direct causal dependencies can be generated for each event transaction log number based on the generated inode map.

At 508, the set of events can be causally ordered based on the set of direct causal dependencies. In one implementation, a topological sort can be used to causally order the set of events based on the set of direct causal dependencies.

Referring now to FIG. 6, there is illustrated an example flow diagram method for causally ordering events within a distributed file system including logging new events into the event transaction log in accordance with implementations of this disclosure.

At 602, an event transaction log can be maintained, wherein entries in the event transaction log are associated with an event transaction log number, and wherein entries in the event transaction log contain at least one modified inode and inode revision number pair, and a set of parent inodes and parent inode revision number pairs. In response to processing an event associated with an event inode, wherein the event inode is associated with an event inode revision number, at 610, the event inode revision number can be incremented. At 612, the event inode and the incremented event inode revision number can be logged into an event transaction log entry. At 614, a set of parent inodes and associated parent inode revision numbers can be added to the event transaction log entry, wherein the set of parent inodes are based on the event inode.

At 620, an inode map can be generated, wherein the inode map maps each inode referenced in the event transaction log to a set of inode revision numbers and a set of event transaction log numbers based on the event transaction log.

At 630, a set of direct causal dependencies can be generated for each event transaction log number based on the generated inode map.

At 640, the set of events can be causally ordered based on the set of direct causal dependencies.

Referring now to FIG. 7, there is illustrated an example flow diagram method for causally ordering events within a distributed file system and making the sequential ordering available to external services in accordance with implementations of this disclosure. At 702, an event transaction log can be maintained, wherein entries in the event transaction log are associated with an event transaction log number, and wherein entries in the event transaction log contain at least one modified inode and inode revision number pair, and a set of parent inodes and parent inode revision number pairs.

At 704, an inode map can be generated, wherein the inode map maps each inode referenced in the event transaction log to a set of inode revision numbers and a set of event transaction log numbers based on the event transaction log.

At 706, a set of direct causal dependencies can be generated for each event transaction log number based on the generated inode map.

At 708, the set of events can be causally ordered based on the set of direct causal dependencies.

At 710, sequential transaction numbers can be assigned to the causally ordered set of events. At 712, the sequential transaction numbers can be made available to other services. In one implementation, the sequential transaction numbers are made available to iNotify, an HDFS component.

Figure 8:
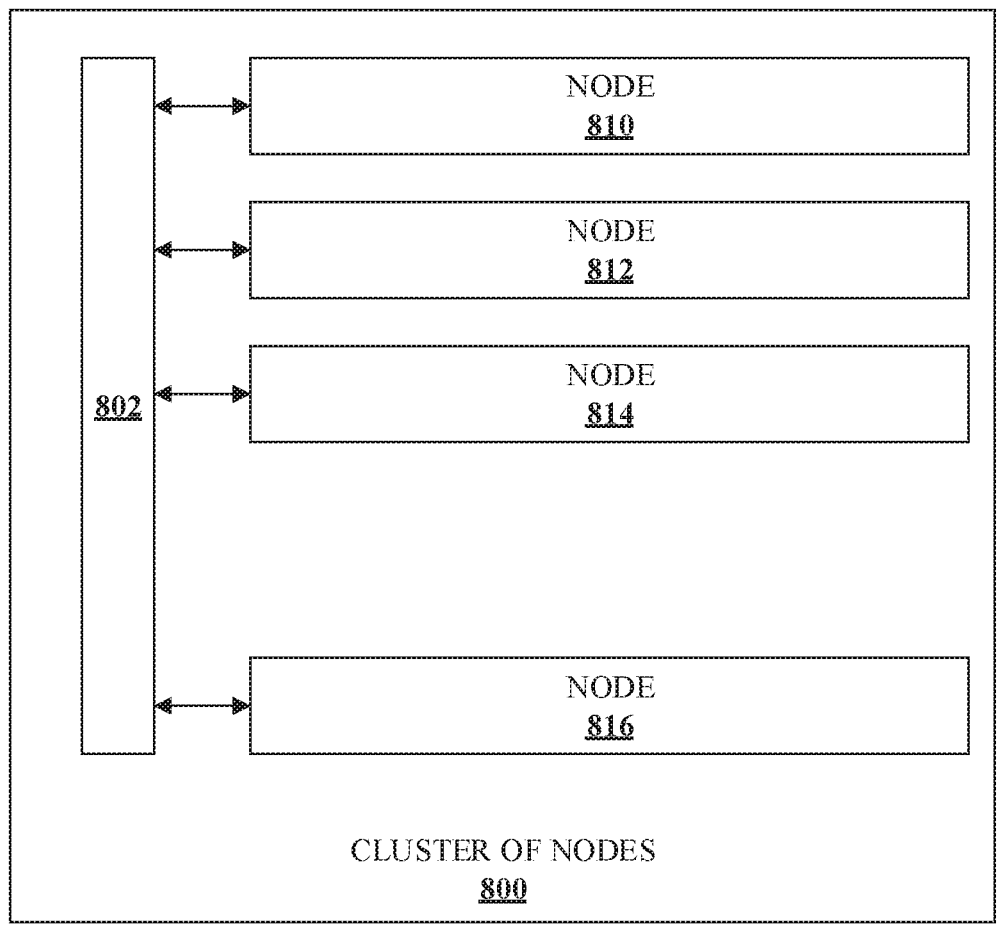
FIG. 8 illustrates an example block diagram of a cluster of nodes in accordance with implementations of this disclosure.

FIG. 8 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, a cluster of nodes typically includes several computers that merely require a network connection and a power cord connection to operate. Each node computer often includes redundant components for power and interfaces.

The cluster of nodes 800 as depicted shows Nodes 810, 812, 814 and 816 operating in a cluster; however, it can be appreciated that more or less nodes can make up a cluster. It can be further appreciated that nodes among the cluster of nodes do not have to be in a same enclosure as shown for ease of explanation in FIG. 8, and can be geographically disparate. Backplane 802 can be any type of commercially available networking infrastructure that allows nodes among the cluster of nodes to communicate amongst each other in as close to real time as the networking infrastructure allows. It can be appreciated that the backplane 802 can also have a separate power supply, logic, I/O, etc. as necessary to support communication amongst nodes of the cluster of nodes.

It can be appreciated that the Cluster of Nodes 800 can be in communication with a second Cluster of Nodes and work in conjunction to provide a distributed file system. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 9:
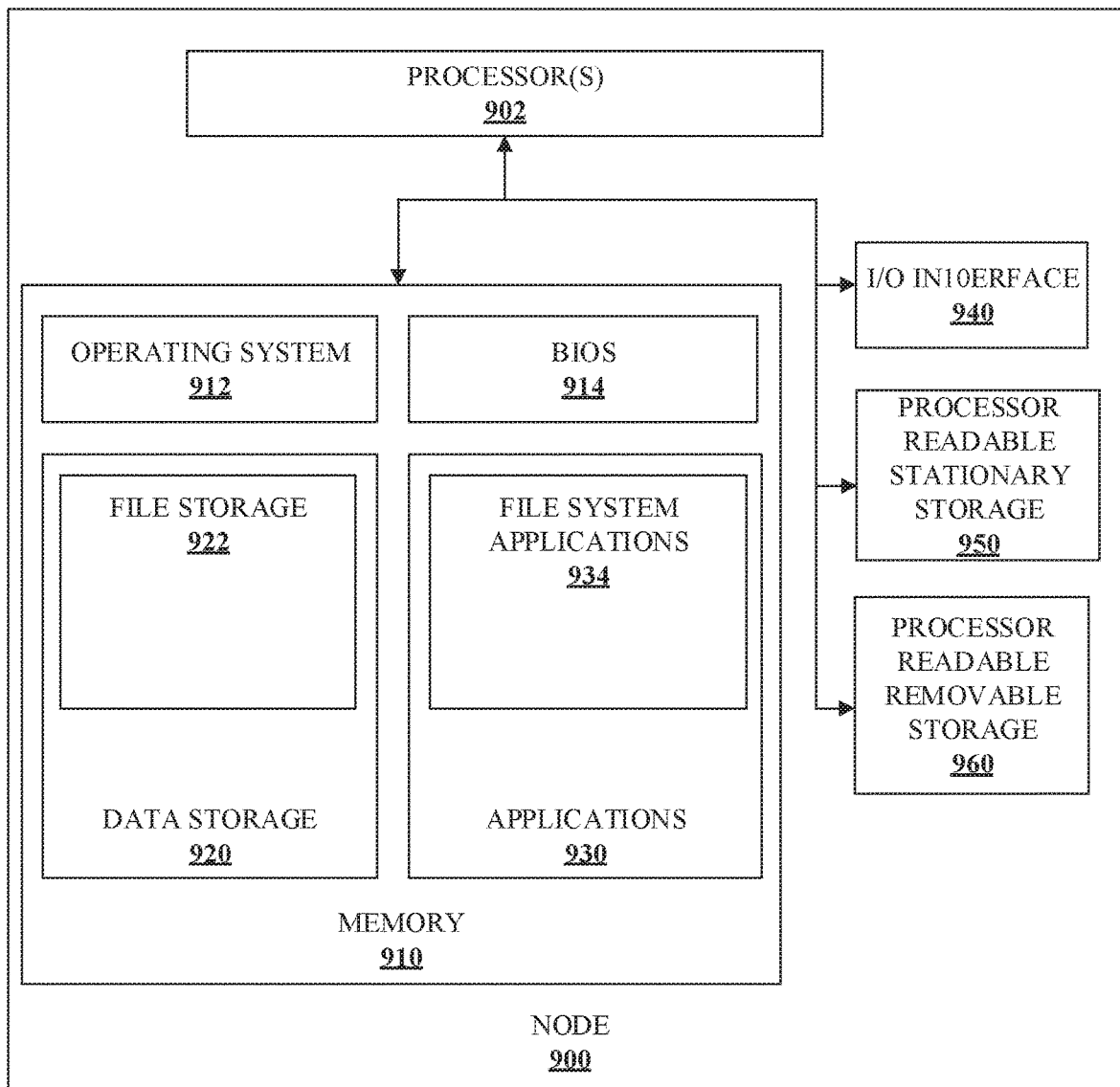
FIG. 9 illustrates an example block diagram of a node in accordance with implementations of this disclosure.

FIG. 9 illustrates an example block diagram of a node 900 in accordance with implementations of this disclosure.

Node 900 includes processor 902 which communicates with memory 910 via a bus. Node 900 also includes input/output interface 940, processor-readable stationary storage device(s) 950, and processor-readable removable storage device(s) 960. Input/output interface 940 can enable node 900 to communicate with other nodes, mobile devices, network devices, and the like. Processor-readable stationary storage device 950 may include one or more devices such as an electromagnetic storage device (hard disk), solid state hard disk (SSD), hybrid of both an SSD and a hard disk, and the like. In some configurations, a node may include many storage devices. Also, processor-readable removable storage device 960 enables processor 902 to read non-transitive storage media for storing and accessing processor-readable instructions, modules, data structures, and other forms of data. The non-transitive storage media may include Flash drives, tape media, floppy media, disc media, and the like.

Memory 910 may include Random Access Memory (RAM), Read-Only Memory (ROM), hybrid of RAM and ROM, and the like. As shown, memory 910 includes operating system 912 and basic input/output system (BIOS) 914 for enabling the operation of node 900. In various embodiments, a general-purpose operating system may be employed such as a version of UNIX, LINUX™, a specialized server operating system such as Microsoft's Windows Server™ and Apple Computer's IoS Server™, or the like.

Applications 930 may include processor executable instructions which, when executed by node 900, transmit, receive, and/or otherwise process messages, audio, video, and enable communication with other networked computing devices. Examples of application programs include database servers, file servers, calendars, transcoders, and so forth. Applications 930 may include, for example, metadata applications, and other file system applications according to implementations of this disclosure.

Human interface components (not pictured), may be remotely associated with node 900, which can enable remote input to and/or output from node 900. For example, information to a display or from a keyboard can be routed through the input/output interface 940 to appropriate peripheral human interface components that are remotely located. Examples of peripheral human interface components include, but are not limited to, an audio interface, a display, keypad, pointing device, touch interface, and the like.

Data storage 920 may reside within memory 910 as well, storing file storage 922 data such as metadata or LIN data. It can be appreciated that LIN data and/or metadata can relate to file storage within processor readable stationary storage 950 and/or processor readable removable storage 960 and/or externally tiered storage locations (not pictured) that are accessible using I/O interface 940. For example, LIN data may be cached in memory 910 for faster or more efficient frequent access versus being stored within processor readable stationary storage 950. In addition, Data storage 920 can also host policy data such as sets of policies applicable to different aspects in accordance with implementations of this disclosure. Index and table data can be stored as files in file storage 922.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method for ordering a set of events in a cluster of nodes operating as a distributed file system comprising:

maintaining an event transaction log, wherein entries in the event transaction log are associated with an event transaction log number, and wherein entries in the event transaction log contain at least one modified inode and inode revision number pair, and a set of parent inodes and parent inode revision number pairs;

generating an inode map wherein the inode map maps each inode referenced in the event transaction log to a set of inode revision numbers and a set of event transaction log numbers based on the event transaction log;

generating a set of direct causal dependencies for each event transaction log number based on the generated inode map; and ordering the set of events based on the set of direct causal dependencies.

2. The method of claim 1, wherein maintaining the event transaction log includes:

in response to processing an event associated with an event inode, wherein the event inode is associated with an event inode revision number:

incrementing the event inode revision number;

logging the event inode and the incremented event inode revision number into an event transaction log entry; and adding a set of parent inodes and associated parent inode revision numbers to the event transaction log entry, wherein the set of parent inodes are based on the event inode.

3. The method of claim 1, wherein at least two of the events in the set of events are processed in parallel on at least two different nodes among the cluster of nodes.

4. The method of claim 1, wherein ordering the set of events is further based on applying a topological sort to the set of direct causal dependencies.

5. The method of claim 1, wherein events in the set of events are based on changes to the metadata associated with at least one inode.

6. The method of claim 1, further comprising:

assigning sequential transaction numbers to the ordered set of events; and making available the sequential transaction numbers to other services.

7. A distributed file system comprising a cluster of nodes of nodes that have at least one storage device and at least one hardware processor configured to:

maintain an event transaction log for a set of events, wherein entries in the event transaction log are associated with an event transaction log number, and wherein entries in the event transaction log contain at least one modified inode and inode revision number pair, and a set of parent inodes and parent inode revision number pairs;

generate an inode map wherein the inode map maps each inode referenced in the event transaction log to a set of inode revision numbers and a set of event transaction log numbers based on the event transaction log;

generate a set of direct causal dependencies for each event transaction log number based on the generated inode map; and order the set of events based on the set of direct causal dependencies.

8. The system of claim 7, further configured to maintain the event transaction log by:

in response to processing an event associated with an event inode, wherein the event inode is associated with an event inode revision number:

incrementing the event inode revision number;

logging the event inode and the incremented event inode revision number into an event transaction log entry; and adding a set of parent inodes and associated parent inode revision numbers to the event transaction log entry, wherein the set of parent inodes are based on the event inode.

9. The system of claim 7, wherein at least two of the events in the set of events are processed in parallel on at least two different nodes among the cluster of nodes.

10. The system of claim 7, wherein ordering the set of events is further based on applying a topological sort to the set of direct causal dependencies.

11. The system of claim 7, wherein events in the set of events are based on changes to the metadata associated with at least one inode.

12. The system of claim 7, further configured to:

assign sequential transaction numbers to the ordered set of events; and make available the sequential transaction numbers to other services.

13. A non-transitory computer readable medium with program instructions stored thereon to perform the following acts:

maintaining an event transaction log, wherein entries in the event transaction log are associated with an event transaction log number, and wherein entries in the event transaction log contain at least one modified inode and inode revision number pair, and a set of parent inodes and parent inode revision number pairs;

generating an inode map wherein the inode map maps each inode referenced in the event transaction log to a set of inode revision numbers and a set of event transaction log numbers based on the event transaction log;

generating a set of direct causal dependencies for each event transaction log number based on the generated inode map; and ordering the set of events based on the set of direct causal dependencies.

14. The non-transitory computer readable medium 13, wherein maintaining the event transaction log further includes:

in response to processing an event associated with an event inode, wherein the event inode is associated with an event inode revision number:

incrementing the event inode revision number;

logging the event inode and the incremented event inode revision number into an event transaction log entry; and adding a set of parent inodes and associated parent inode revision numbers to the event transaction log entry, wherein the set of parent inodes are based on the event inode.

15. The non-transitory computer readable medium 13, wherein at least two of the events in the set of events are processed in parallel on at least two different nodes among a cluster of nodes.

16. The non-transitory computer readable medium 13, wherein ordering the set of events is further based on applying a topological sort to the set of direct causal dependencies.

17. The non-transitory computer readable medium 13, wherein events in the set of events are based on changes to the metadata associated with at least one inode.

18. The non-transitory computer readable medium of claim 13, with program instructions stored thereon to further perform the following acts:
  assigning sequential transaction numbers to the ordered set of events; and
  making available the sequential transaction numbers to other services.

\* \* \* \* \*